US011140742B2

(12) United States Patent
Kubota et al.

(10) Patent No.: US 11,140,742 B2
(45) Date of Patent: Oct. 5, 2021

(54) METHODS AND APPARATUS FOR CELL DISCONTINUOUS TRANSMISSION (DTX) SCHEDULING

(71) Applicant: QUALCOMM Incorporated, San Diego, CA (US)

(72) Inventors: Keiichi Kubota, San Diego, CA (US); Gavin Bernard Horn, La Jolla, CA (US); Luis Lopes, Swindon (GB); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 15/621,072

(22) Filed: Jun. 13, 2017

(65) Prior Publication Data
US 2018/0049270 A1 Feb. 15, 2018

Related U.S. Application Data

(60) Provisional application No. 62/374,459, filed on Aug. 12, 2016.

(51) Int. Cl.
*H04W 76/28* (2018.01)
*H04W 52/02* (2009.01)
(Continued)

(52) U.S. Cl.
CPC .......... *H04W 76/28* (2018.02); *H04W 48/08* (2013.01); *H04W 52/0206* (2013.01);
(Continued)

(58) Field of Classification Search
CPC . H04W 76/28; H04W 48/08; H04W 72/0446; H04W 52/0206; H04W 72/1289; H04W 52/0216; H04W 52/0219
See application file for complete search history.

(56) References Cited

U.S. PATENT DOCUMENTS 9,277,520 B2 * 3/2016 Kazmi .............. H04W 56/0085
9,439,188 B2  9/2016 Jafarian et al.
(Continued)

FOREIGN PATENT DOCUMENTS

CN       104244380 A    12/2014
EP         2991437 A1    3/2016
(Continued)

OTHER PUBLICATIONS

Broadcom Corporation: "Handling RRC Idle Mode and Legacy UEs with Small Cell DTX", 3GPP Draft; R2-141230, 3rd Generation Partnership Project (3GPP), Mobile Competence Centre, 650, Route Des Lucioles, F-06921, Sophia-Antipolis Cedex, France, vol. RAN WG2, No. Valencia, Spain; Mar. 21, 2014, XP050817438, Retrieved from the Internet: URL:http://www.3gpp.org/ftp/tsg_ran/WG2_RL2/TSGR2_85bis/Docs/ [retrieved on Mar. 21, 2014], 3 pages.
(Continued)

*Primary Examiner* — Omer S Mian
(74) *Attorney, Agent, or Firm* — Patterson & Sheridan, LLP

(57) ABSTRACT

Certain aspects of the present disclosure relate to methods and apparatus for cell DTX (Discontinuous Transmission) scheduling. A Base Station (BS) determines an operational schedule for the BS including at least one ON period and at least one OFF period, wherein the BS provides a reduced level of service during the at least one OFF period relative to the at least one ON period. The BS transmits the determined operational schedule. A User Equipment (UE) receives the BS's operational schedule and determines, based on the BS's operational schedule and its own operational schedule also including ON and OFF periods, whether to perform at least one service associated with the BS.

31 Claims, 11 Drawing Sheets

(51) Int. Cl.

| | |
|---|---|
| *H04W 72/04* | (2009.01) |
| *H04W 48/08* | (2009.01) |
| *H04W 72/12* | (2009.01) |
| *H04W 88/08* | (2009.01) |
| *H04W 48/02* | (2009.01) |
| *H04W 48/20* | (2009.01) |
| *H04W 68/00* | (2009.01) |

(52) U.S. Cl.
CPC ... *H04W 52/0216* (2013.01); *H04W 52/0219* (2013.01); *H04W 72/0446* (2013.01); *H04W 72/1263* (2013.01); *H04W 72/1289* (2013.01); *H04W 88/08* (2013.01); *H04W 48/02* (2013.01); *H04W 48/20* (2013.01); *H04W 52/02* (2013.01); *H04W 68/00* (2013.01); *Y02D 30/70* (2020.08)

(56) References Cited

U.S. PATENT DOCUMENTS

| | | | | |
|---|---|---|---|---|
| 9,451,487 | B2* | 9/2016 | Wang | H04W 24/08 |
| 2010/0113023 | A1* | 5/2010 | Huang | H04W 52/0216 455/436 |
| 2012/0115471 | A1* | 5/2012 | Awoniyi | H04W 52/0206 455/435.1 |
| 2014/0161007 | A1* | 6/2014 | Donthi | H04W 52/0216 370/311 |
| 2015/0282080 | A1 | 10/2015 | Maattanen et al. | |
| 2015/0327324 | A1 | 11/2015 | Wei et al. | |
| 2016/0081022 | A1* | 3/2016 | Haneji | H04W 76/28 370/311 |
| 2017/0048920 | A1* | 2/2017 | Kim | H04W 4/70 |
| 2017/0332288 | A1* | 11/2017 | Sadek | H04L 1/1887 |
| 2018/0084486 | A1* | 3/2018 | Pradas | H04W 24/10 |
| 2020/0084713 | A1* | 3/2020 | Haneji | H04W 52/0229 |

FOREIGN PATENT DOCUMENTS

| | | | |
|---|---|---|---|
| JP | 2014204344 A | 10/2014 | |
| WO | 2014134556 A1 | 9/2014 | |
| WO | WO-2016074185 A1 * | 5/2016 | ........ H04L 1/1887 |

OTHER PUBLICATIONS

Broadcom Corporation: "Small Cell On/Off procedures for Single Carrier case", May 18, 2014 (May 18, 2014), 3GPP Draft; R2-142125-Small Cell On Off Procedures for Single Carrier Case, 3rd Generation Partnership Project (3GPP), Mobile Competence Centre; 650, Route Des Lucioles; F-06921 Sophia-Antipolis Cedex; France, 4 Pages, XP050793353, Retrieved from the Internet: URL: http://www.3gpp.org/ftp/Meetings_3GPP_SYNC/RAN2/Docs/ [retrieved on May 18, 2014] the whole document.
International Search Report and Written Opinion—PCT/US2017/037494—ISA/EPO—dated Oct. 24, 2017.
Qualcomm Incorporated et al., "UE Battery Life Impact for NR Cell DTX for Network Energy Efficiency", 3GPP Draft; R2-168600, 3rd Generation Partnership Project (3GPP), Mobile Competence Centre, 650, Route Des Lucioles, F-06921, Sophia-Antipolis Cedex, France, vol. RAN WG2, No. Reno, US; Nov. 13, 2016, XP051178170, Retrieved from the Internet: URL:http://www.3gpp.org/ftp/Meetings_3GPP SYNC/RAN2/Docs/ [retrieved on Nov. 13, 2016], 2 pages.

* cited by examiner

METHODS AND APPARATUS FOR CELL DISCONTINUOUS TRANSMISSION (DTX) SCHEDULING

This application claims priority to U.S. Provisional Application No. 62/374,459, entitled "METHODS AND APPARATUS OF CELL DISCONTINUOUS TRANSMISSION (DTX) SCHEDULING", filed on Aug. 12, 2016, which is expressly incorporated by reference herein in its entirety.

FIELD

The present disclosure relates generally to wireless communication, and more particularly, to methods and apparatus for flexible bandwidth operation in a wireless communicant network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include, Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

Some wireless communication standards base user equipment handoff decisions based, at least in part, on downlink measurements. Future generation wireless communication may focus on user-centric networks. Accordingly, it may be desirable to have an efficient handover framework for user-centric networks

SUMMARY

Certain aspects of the present disclosure provide a method for wireless communications by a User Equipment (UE). The method generally includes receiving a first operational schedule for a base station including a first set of ON periods and a first set of OFF periods, wherein the base station provides a reduced level of service during the OFF periods relative to the ON periods, determining a second operational schedule for the UE including a second set of ON periods and a second set of OFF periods, wherein the UE switches to a battery efficient operation mode during the OFF periods relative to the ON periods, and determining, based at least on the first and second operational schedules, whether to perform at least one service associated with the base station.

Certain aspects of the present disclosure provide a method for wireless communications by a Base Station (BS). The method generally includes determining an operational schedule for the base station including at least one ON period and at least one OFF period, wherein the base station provides a reduced level of service during the at least one OFF period relative to the at least one ON period, and transmitting the operational schedule.

Certain aspects of the present disclosure provide an apparatus for wireless communications by a User Equipment (UE). The method generally includes means for receiving a first operational schedule for a base station including a first set of ON periods and a first set of OFF periods, wherein the base station provides a reduced level of service during the OFF periods relative to the ON periods, means for determining a second operational schedule for the UE including a second set of ON periods and a second set of OFF periods, wherein the UE switches to a battery efficient operation mode during the OFF periods relative to the ON periods, and means for determining, based at least on the first and second operational schedules, whether to perform at least one service associated with the base station.

Certain aspects of the present disclosure provide an apparatus for wireless communications by a Base Station (BS). The apparatus generally includes means for determining an operational schedule for the base station including at least one ON period and at least one OFF period, wherein the base station provides a reduced level of service during the at least one OFF period relative to the at least one ON period, and means for transmitting the operational schedule.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (e.g., LTE-whitespace), etc.

DETAILED DESCRIPTION

Figure 1:
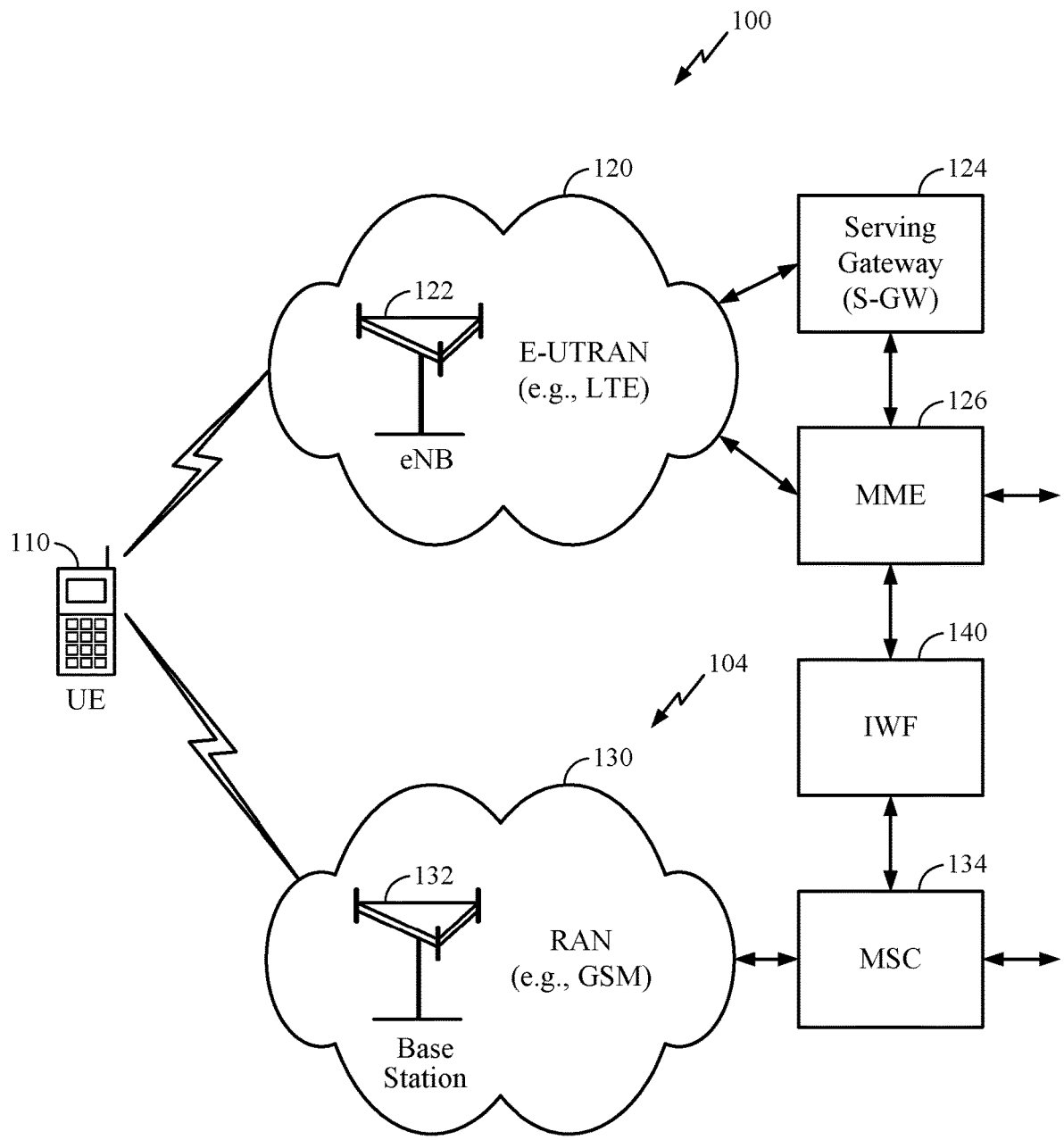
FIG. 1 is a diagram illustrating an example of a network architecture.

Small cell DTX was studied for LTE in Rel-12 and the outcome of the study is captured in 3GPP TR 36.872. With regard to NR, a question that frequently comes up is whether a UE in an idle mode/RRC inactive state should be allowed to camp on a NR cell (e.g., implementing DTX) when its ON, knowing that the NR cell may switch OFF before the UE wakes up the next time to receive a page. Generally, if a UE in an idle mode/RRC inactive state (e.g., DRX OFF period) is camped on a cell, and the cell turns off (e.g., enters a DTX OFF period or inactive state), the UE may be confused leading to service disruption. For example, this may occur when the next UE DRX ON period does not overlap with a DTX ON period of the cell. This condition may also lead to UE power wastage since the UE may have to reselect another cell to listen to pages, which is not optimal, especially for IOE (Internet of Everything) devices which want to optimize their energy savings.

To address the above issue, current standards provide certain techniques that bar cells from allowing UE to camp on to them. However, the existing techniques have a common problem that cell barring applies only for a certain period of time (e.g., 5 min according to 3GPP TS 36.304, sub clause 5.3.1), and thus, the UEs may tune to the same cell/frequency and re-check the barring status, wasting resources including power. None of the existing techniques allow a UE in an inactive state (e.g., DRX idle mode/RRC inactive state), to know whether a particular cell may be active (e.g., DTX ON period) when it wakes up next.

Certain aspects of the present disclosure discuss techniques allowing a node (e.g., eNB) to advertise its operational schedule (e.g., DTX ON and OFF periods) allowing UEs to decide whether to camp on a cell based on whether one or more of the UE's ON periods (e.g., DRX ON periods) overlap with ON periods of the cell. Certain aspects of the present disclosure also discuss techniques to adjust an operational schedule (e.g., DTX schedule) of a cell and/or an operational schedule (e.g., DRX schedule) of a UE to enable a UE to camp on a particular cell.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These communications networks are merely listed as examples of networks in which the techniques described in this disclosure may be applied; however, this disclosure is not limited to the above-described communications network.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn attention, especially in the uplink (UL) communications where lower PAPR greatly benefits the wireless node in terms of transmit power efficiency.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), a wearable device, a drone, a robot/robotic device, or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical/healthcare devices or equipment, biometric sensors/devices, an entertainment device (e.g., music device, video device, satellite radio, gaming device, etc.), a vehicular component or sensor, meters, sensors, industrial manufacturing equipment, a positioning device (e.g., GPS, Glonass, Beidou, terrestrial-based, etc.), a drone, a robot/robotic device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication(s) (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including new radio (NR) technologies.

NR may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

FIG. 1 shows an exemplary deployment in which aspects of the present disclosure may be practiced.

In certain aspects, a UE (e.g., UE 110) receives a first operational schedule for a base station including a first set of ON periods and a first set of OFF periods, wherein the base station provides a reduced level of service during the OFF periods relative to the ON periods. The UE determines a second operational schedule for the UE including a second set of ON periods and a second set of OFF periods, wherein the UE switches to a battery efficient operation mode during the OFF periods relative to the ON periods. The UE determines, based at least on the first and second operational schedules, whether to perform at least one service associated with the base station.

In certain aspects, a Base Station (BS) (e.g., BS 132 or Node B 122) determines an operational schedule for the base station including at least one ON period and at least one OFF period, wherein the base station provides a reduced level of service during the at least one OFF period relative to the at least one ON period. The base station transmits the determined operational schedule.

FIG. 1 shows an exemplary deployment in which multiple wireless networks have overlapping coverage. A radio access network such as an evolved universal terrestrial radio access network (E-UTRAN) 120 may support LTE and may include a number of Node Bs (NBs) 122 and other network entities that can support wireless communication for user equipments (UEs). Each NB may provide communication coverage for a particular geographic area. The term "cell" can refer to a coverage area of a TRP, NB and/or an NB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1×CSFB).

E-UTRAN 120, serving gateway 124, and MME 126 may be part of an LTE network 100. RAN 130 and MSC 134 may be part of a GSM network 104. For simplicity, FIG. 1 shows only some network entities in the LTE network 100 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

The system illustrated in FIG. 1 may include, for example, a long term evolution (LTE) network 120 and a GMS network 130. According to aspects, the system illustrated in FIG. 1 may include one or more other networks, such as a NR network. The NR may include may include a number of Node Bs (e.g., evolved NodeBs (eNB), 5G Node B, TRPs etc.) 110 and other network entities. A Node B may be a station that communicates with the UEs and may also be referred to as a base station, an access point, etc. A Node B and 5G Node B are other examples of stations that communicates with the UEs.

Each Node B 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and TRP may be interchangeable.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc. In aspects, UE 110 may be a Dual SIM dual standby (DSDS) UE.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 100 and may camp on the LTE network while in the idle mode. LTE network 100 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1×RTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 tranmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
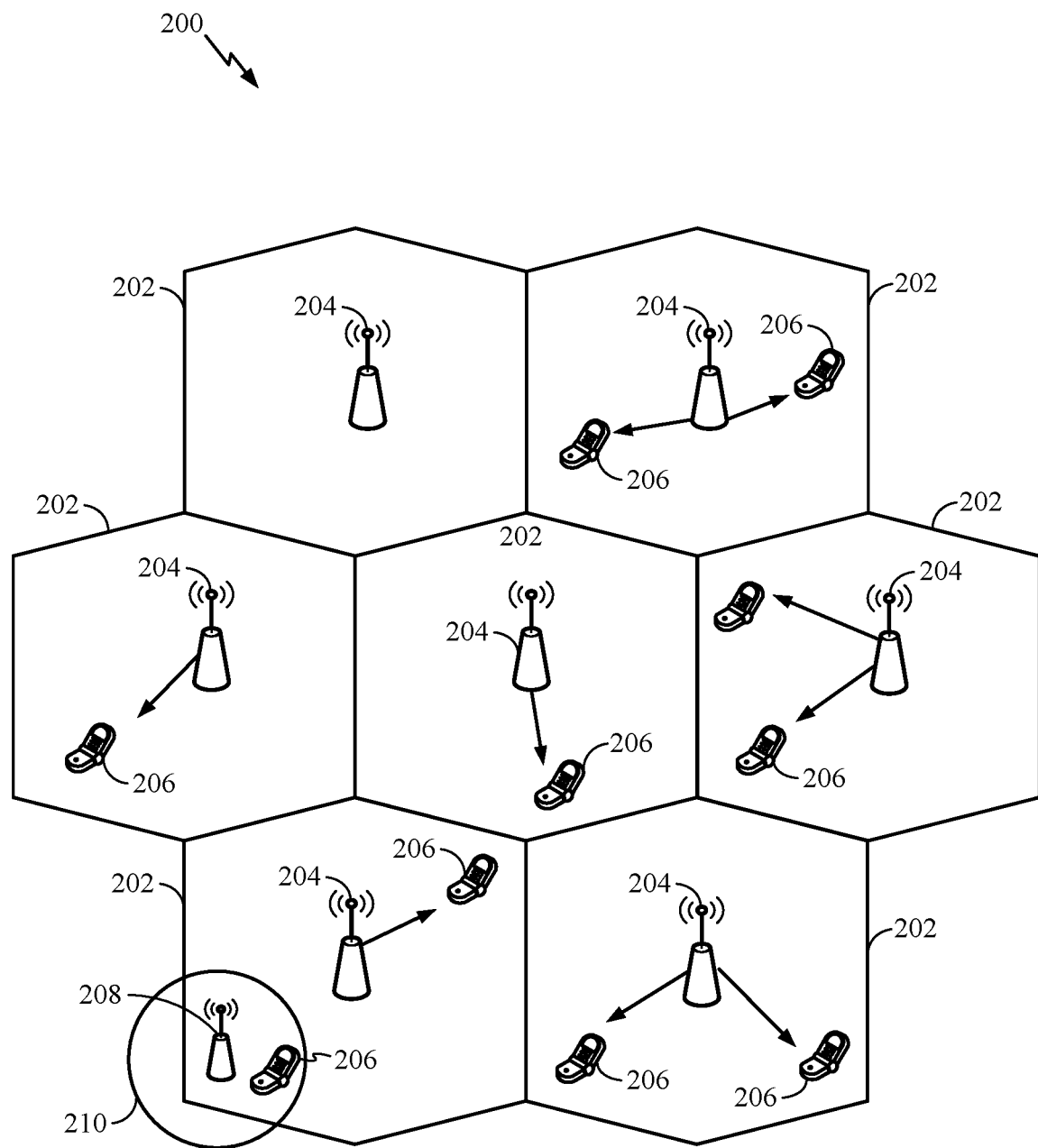
FIG. 2 is a diagram illustrating an example of an access network.

FIG. 2 is a diagram illustrating an example of an access network 200 in which aspects of the present disclosure may be practiced. For example, UEs 206 and NodeBs (NBs) 204 may be configured to implement techniques for implementing a cell DTX schedule in accordance with aspects of the present disclosure.

In FIG. 2, the access network 200 is divided into a number of cellular regions (cells) 202. One or more lower power class Node Bs 208 may have cellular regions 210 that overlap with one or more of the cells 202. A lower power class Node B 208 may be referred to as a remote radio head (RRH). The lower power class e Node B NB 208 may be a femto cell (e.g., home Node B (H Node B)), pico cell, or micro cell. The macro Node Bs 204 are each assigned to a respective cell 202 and are configured to provide an access point to the EPC 110 for all the UEs 206 in the cells 202. There is no centralized controller in this example of an access network 200, but a centralized controller may be used in alternative configurations. The Node Bs 204 are responsible for all radio related functions including radio bearer control, admission control, mobility control, scheduling, security, and connectivity to the serving gateway.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The Node B 204 may have multiple antennas supporting MIMO technology. The use of MIMO technology enables the Node Bs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the Node B 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
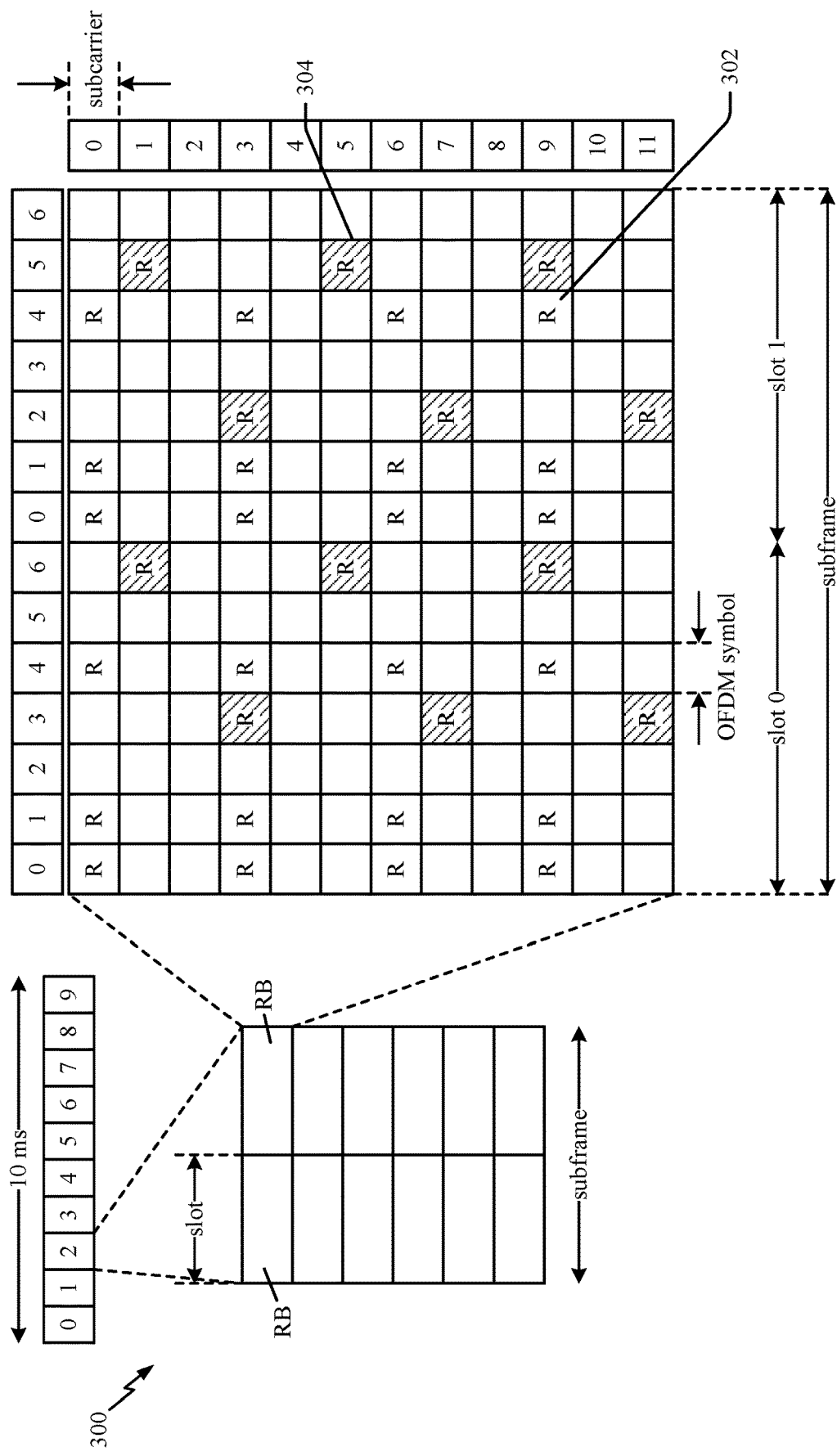
FIG. 3 is a diagram illustrating an example of a DL frame structure in LTE.

FIG. 3 is a diagram 300 illustrating an example of a DL frame structure in a telecommunications system (e.g., LTE). A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an Node B may send a primary synchronization signal (PSS) and a secondary synchronization signal (SSS) for each cell in the Node B. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The Node B may send a Physical Broadcast Channel (PBCH) in symbol periods 0 to 3 in slot 1 of subframe 0. The PBCH may carry certain system information.

The Node B may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The Node B may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The Node B may send a Physical Downlink Shared Channel (PDSCH) in the remaining symbol periods of each subframe. The PDSCH may carry data for UEs scheduled for data transmission on the downlink.

The Node B may send the PSS, SSS, and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH, and PHICH in a broadcast manner to all UEs, may send the PDCCH in a unicast manner to specific UEs, and may also send the PDSCH in a unicast manner to specific UEs. A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

Figure 4:
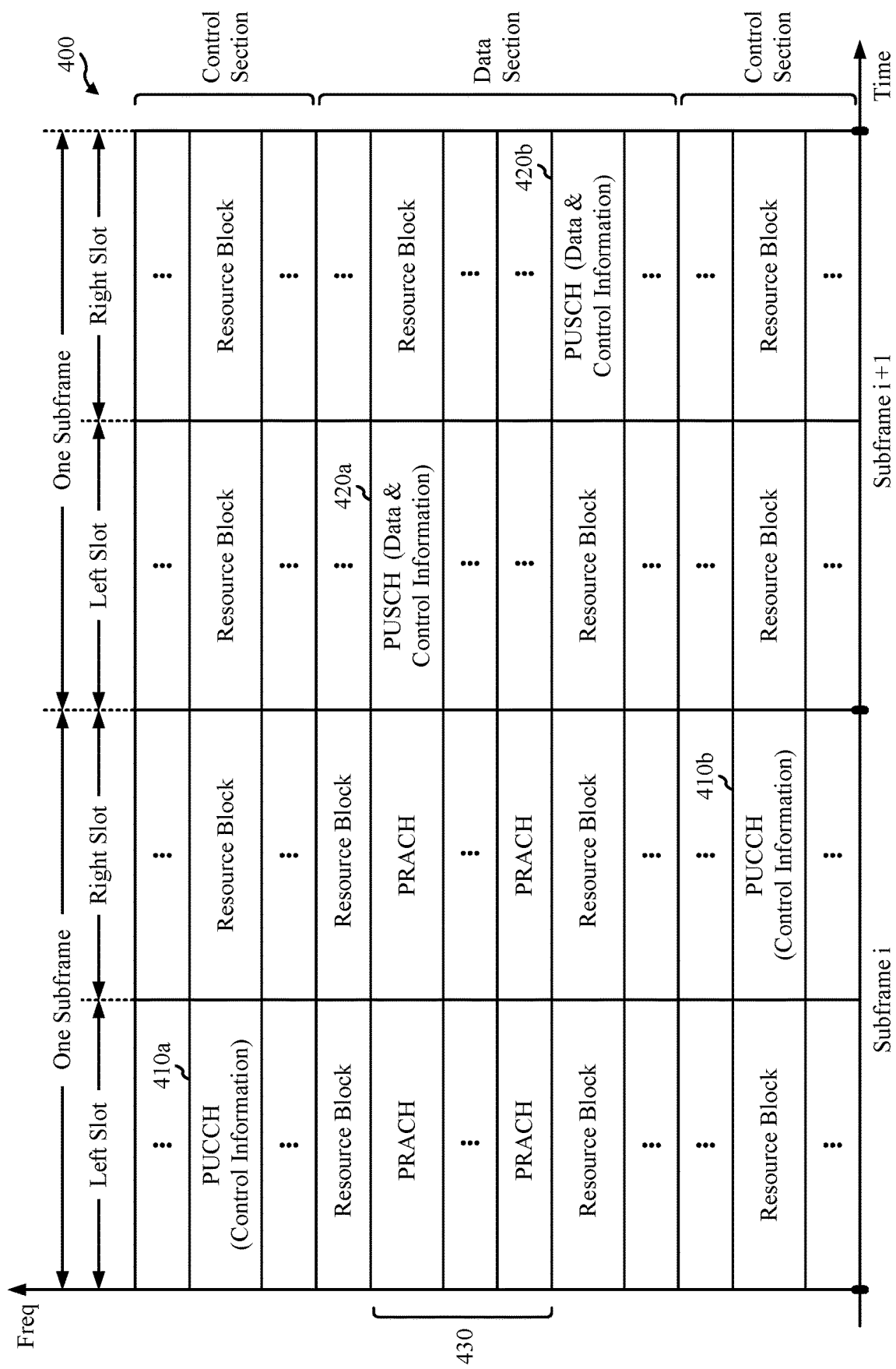
FIG. 4 is a diagram illustrating an example of an UL frame structure in LTE.

FIG. 4 is a diagram 400 illustrating an example of an UL frame structure in telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks in the control section to transmit control information to a Node B. The UE may also be assigned resource blocks in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
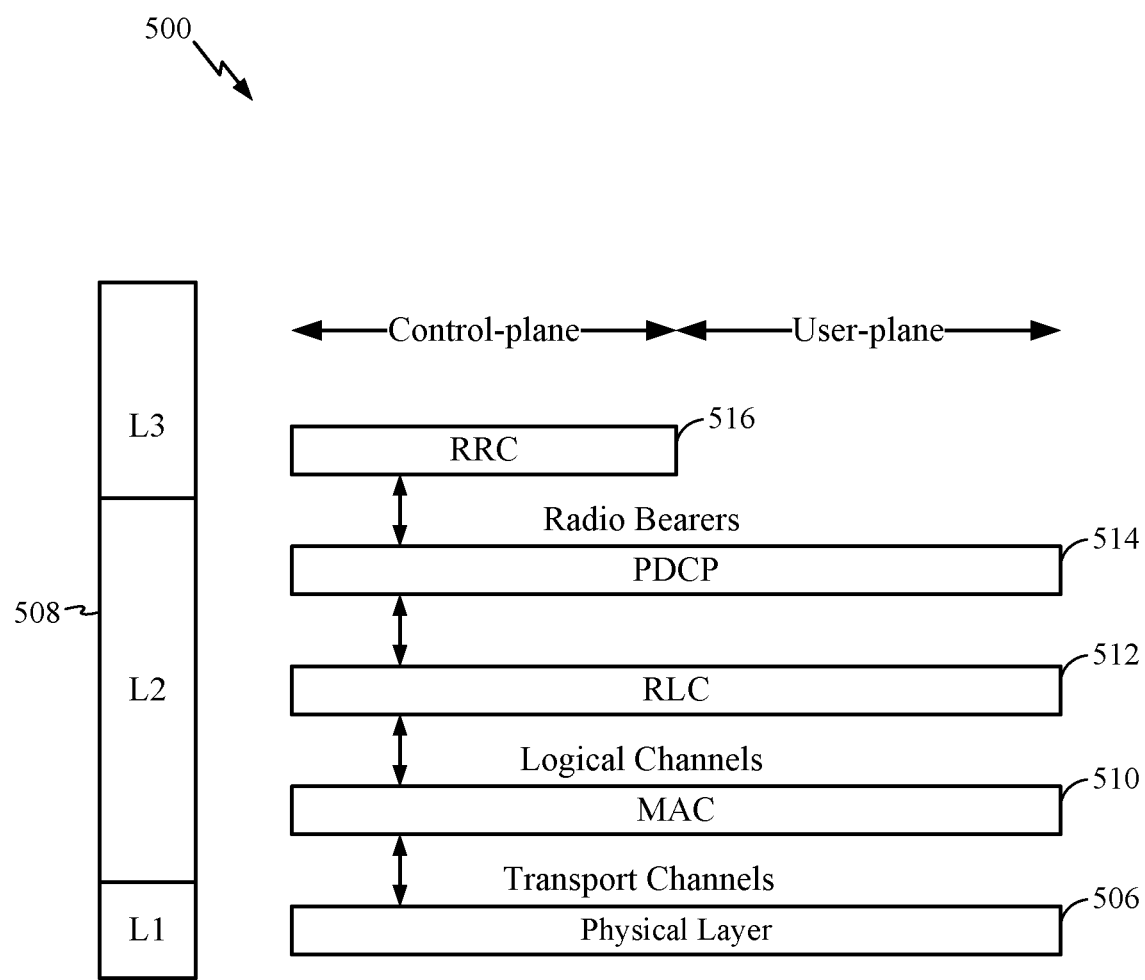
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
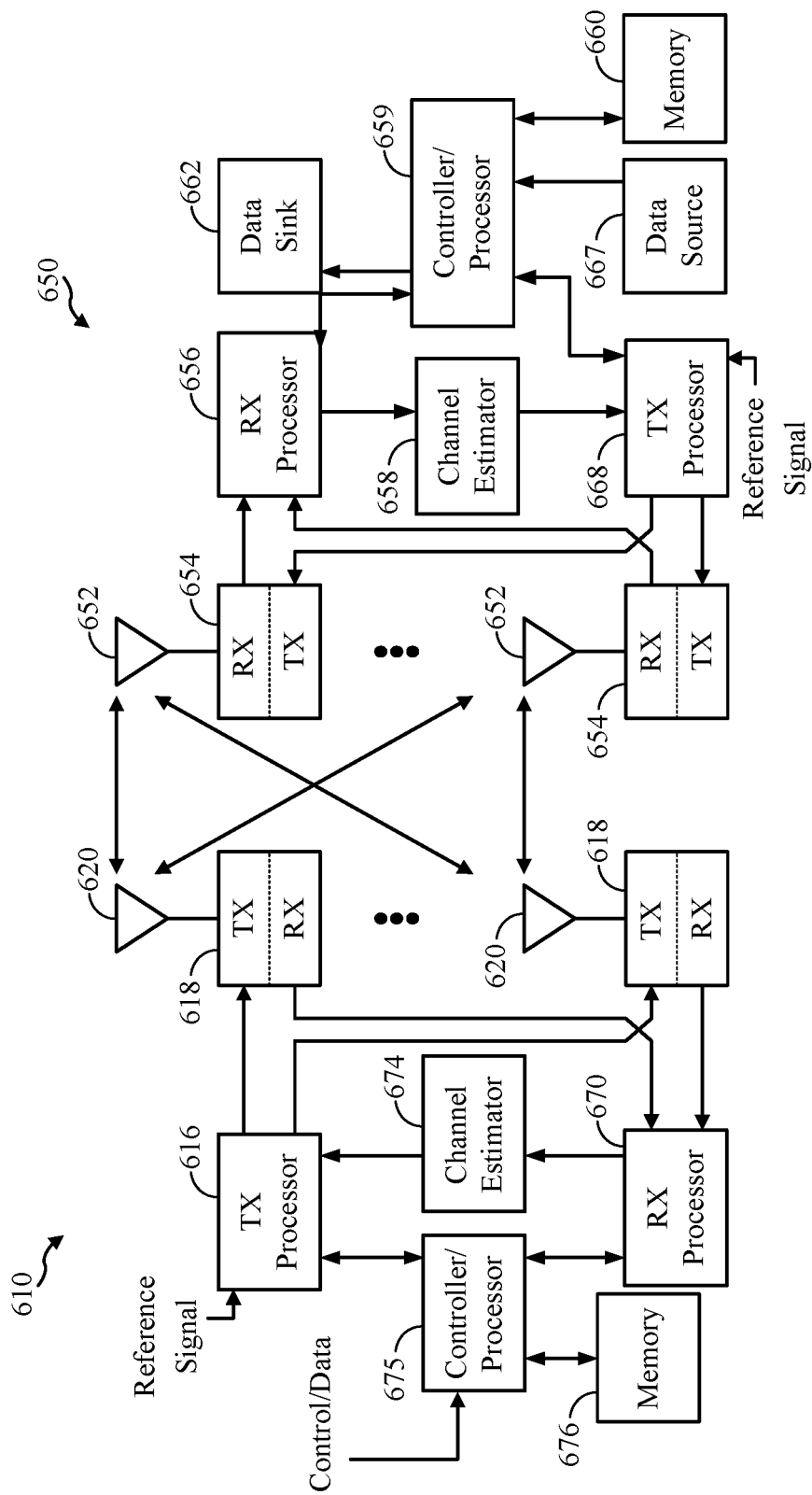
FIG. 6 is a diagram illustrating an example of a base station and user equipment in an access network, in accordance with certain aspects of the disclosure.

FIG. 6 is a block diagram of a Node B 610 in communication with a UE 650 in an access network, in which aspects of the present disclosure may be practiced.

In certain aspects, a UE (e.g., UE 650) receives a first operational schedule for a base station including a first set of ON periods and a first set of OFF periods, wherein the base station provides a reduced level of service during the OFF periods relative to the ON periods. The UE determines a second operational schedule for the UE including a second set of ON periods and a second set of OFF periods, wherein the UE switches to a battery efficient operation mode during the OFF periods relative to the ON periods. The UE determines, based at least on the first and second operational schedules, whether to perform at least one service associated with the base station.

In certain aspects, a Base Station (BS) (e.g., Node B 610) determines an operational schedule for the base station including at least one ON period and at least one OFF period, wherein the base station provides a reduced level of service during the at least one OFF period relative to the at least one ON period. The base station transmits the determined operational schedule.

It may be noted that the UE noted above for implementing the flexible bandwidth operation in accordance with certain aspects of the present disclosure may be implemented by a combination of one or more of the controller 659, the RX processor 656, the channel estimator 658 and/or transceiver 654 at the UE 650, for example. Further, the BS may be implemented by a combination of one or more of the controller 675, the TX processor and/or the transceiver 618 at the Node B 610.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the Node B 610. These soft decisions may be based on channel estimates computed by the channel estimator 658. The soft decisions are then decoded and deinterleaved to recover the data and control signals that were originally transmitted by the Node B 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the Node B 610, the controller/processor 659 implements the L2 layer for the user plane and the control plane by providing header compression, ciphering, packet segmentation and reordering, and multiplexing between logical and transport channels based on radio resource allocations by the Node B 610. The controller/processor 659 is also responsible for HARQ operations, retransmission of lost packets, and signaling to the Node B 610.

Channel estimates derived by a channel estimator 658 from a reference signal or feedback transmitted by the Node B 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the Node B 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the Node B 610 and the UE 650, respectively.

Figure 7:
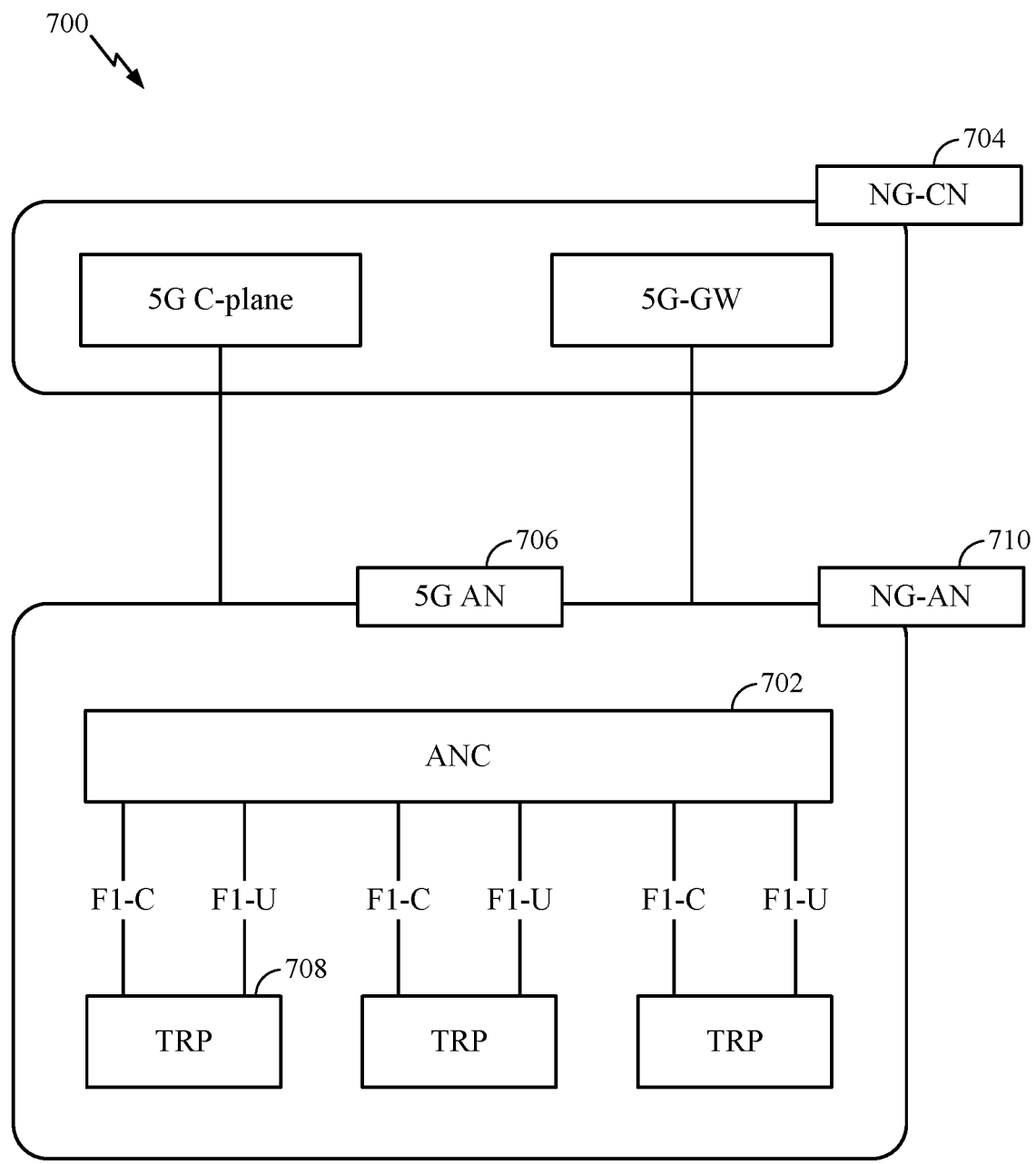
FIG. 7 illustrates a logical architecture of a distributed RAN, in accordance with certain aspects of the present disclosure.
Figure 8:
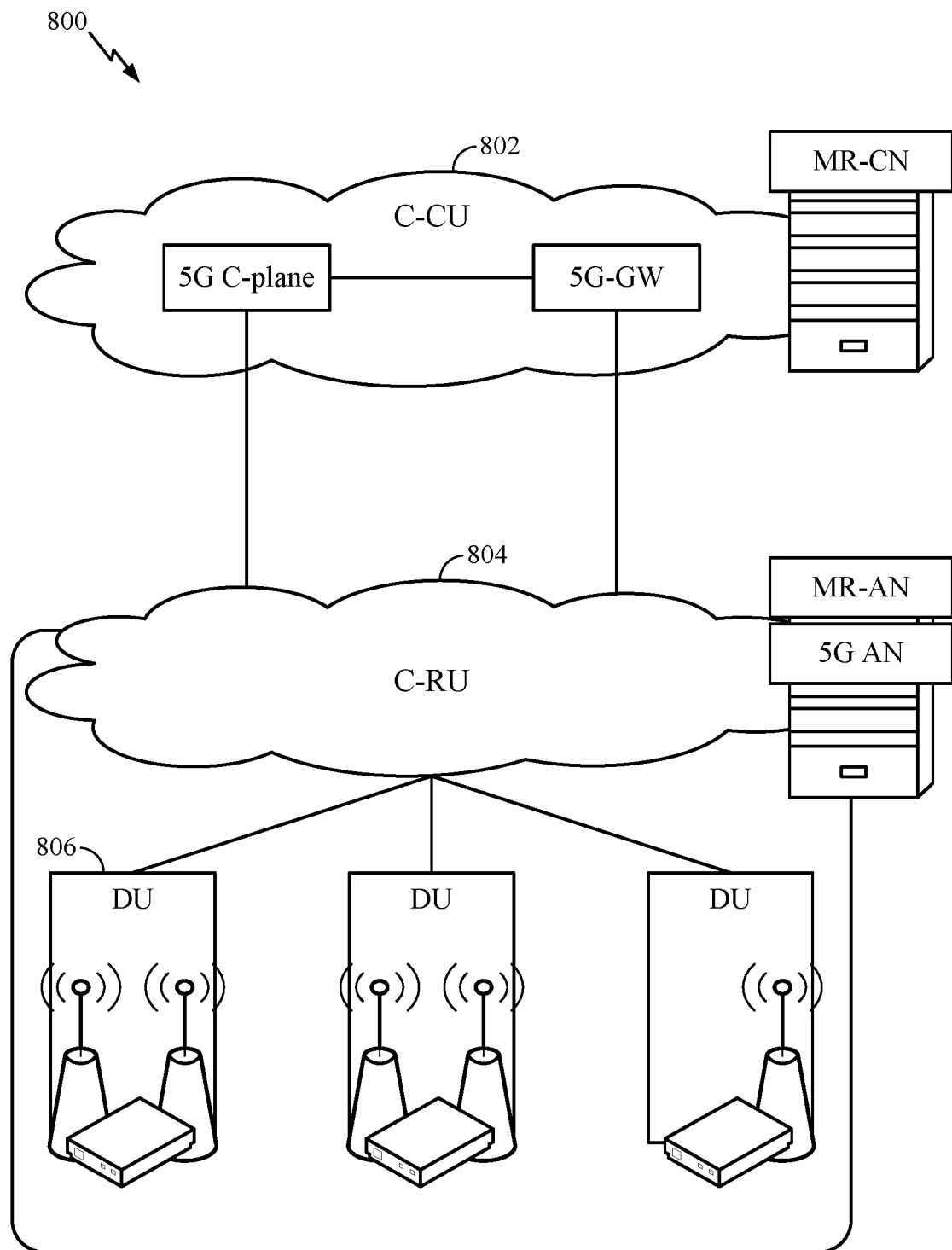
FIG. 8 illustrates an example physical architecture of a distributed RAN, in accordance with certain aspects of the present disclosure.

The controller/processor 659 and/or other processors, components and/or modules at the UE 650 may perform or direct operations, for example, operations 800 in FIG. 8, and/or other processes for the techniques described herein for implementing the new transmission scheme. Further, the controller/processor 675 and/or other processors, components and/or modules at the Node B 610 may perform or direct operations, for example, operations 700 in FIG. 7, and/or other processes for the techniques described herein for implementing the new transmission scheme. In certain aspects, one or more of any of the components shown in FIG. 6 may be employed to perform example operations 700 and 800, and/or other processes for the techniques described herein. The memories 660 and 676 may store data and program codes for the UE 650 and Node B 610 respectively, accessible and executable by one or more other components of the UE 650 and the Node B 610.

Example Ran Architecture

FIG. 7 illustrates an example logical architecture of a distributed RAN 700, according to aspects of the present disclosure. A 5G access node 706 may include an access node controller (ANC) 702. The ANC may be a central unit of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, NR NB, NR Node Bs, gNBs, Aps, or some other term). As described above, a TRP may be used interchangeably with "cell."

The TRPs 708 may be a distributed unit (DU). The TRPs may be connected to one ANC or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The Radio Resource Control (RRC) layer, a new protocol layer for new QoS framework such as Packet Data Adaptation Protocol (PDAP), Packet Data Convergence Protocol (PDCP) layer, Radio Link Control (RLC) layer, Medium Access Control (MAC) layer, and a Physical (PHY) layers may be adaptably placed at the ANC or TRP. According to certain aspects, a BS may include ANC 702 or one or more distributed units (e.g., one or more TRPs 708).

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 806 may host one or more TRPs. The DU may be located at edges of the network with radio frequency (RF) functionality.

It may be noted that the terms base station and cell are used interchangeably throughout this disclosure and include ANC and one or more DUs (e.g. TRPs).

Example Techniques for Cell Discontinuous Transmission (DTX) Scheduling

Certain standards (e.g., 3GPP TR 38.913) require that network energy efficiency be considered as a basic principle in NR (New Radio) design. For example, the target is a design with the ability to efficiently deliver data and the ability to provide sufficiently granular network discontinuous transmission (DTX) when there is no data to transmit and network availability is maintained. According to the requirements, cell DTX feature needs to be considered for NR.

Small cell DTX was studied for LTE in Rel-12 and the outcome of the study is captured in 3GPP TR 36.872. With regard to NR, a question that frequently comes up is whether a UE in an idle mode/RRC inactive state should be allowed to camp on a NR cell (e.g., implementing DTX) when its ON, knowing that the NR cell may switch OFF before the UE wakes up the next time to receive a page. Generally, if a UE in an idle mode or some other inactive state (e.g., an RRC inactive state that may be defined in 5G standards), is camped on a cell, and the cell turns off (e.g., enters a DTX OFF period or inactive state), the UE may be confused leading to service disruption. For example, this may occur when the next UE DRX ON period does not overlap with a DTX ON period of the cell. This condition may also lead to UE power wastage since the UE may have to reselect another cell to listen to pages, which is not optimal, especially for IOE (Internet of Everything) devices which want to optimize their energy savings. In an aspect, when the UE is in the inactive state, no air interface is dedicatedly assigned to the UE, UE context is maintained in RAN, and a longer DRX cycle than RRC CONNECTED mode may be applied.

To address the above issue, current standards provide certain techniques. According to one technique, a base station may signal a cell status IE (Information Element) set to "barred" to avoid UEs to camp on the cell. For example, SIB 1 signal parameter cellStatus is set to "barred" and parameter intraFreqReselection is set to "allowed", barring only a specific cell. In another example, SIB 1 signal parameter cellStatus is set to "barred" and parameter intraFreqReselection is set to "not allowed" barring the entire frequency. However, this makes sense as long as all the cells on the frequency have the same characteristic, i.e., it makes sense only if the entire frequency is not allowed, but does not support a mix of these cells. Another example implements "SI (System Information) absence." This generally means that the cell is not supposed to be used for idle mode UEs as UEs may not be able to read SI and camp on the cell. It may be noted that only the specific cell with missing SI is barred to be camped on by UEs.

However, the above mentioned techniques have a common problem that cell barring applies only for a certain period of time (e.g., 5 min according to 3GPP TS 36.304, sub clause 5.3.1), and thus, the UEs may tune to the same cell/frequency and re-check the barring status, wasting resources including power. None of the existing techniques allow a UE in an inactive state (e.g., DRX idle mode/RRC inactive state), to know whether a particular cell may be active (e.g., DTX ON period) when it wakes up next.

Certain aspects of the present disclosure discuss techniques allowing a network node (e.g., base station including TRP, ANC etc.) to advertise its operational schedule (e.g., DTX ON and OFF periods) allowing UEs to decide whether to camp on a cell based on whether one or more of the UE's ON periods (e.g., DRX ON periods) overlap with ON periods of the cell. Certain aspects of the present disclosure also discuss techniques to adjust an operational schedule (e.g., DTX schedule) of a cell and/or an operational schedule (e.g., DRX schedule) of a UE to enable a UE to camp on a particular cell.

Figure 9:
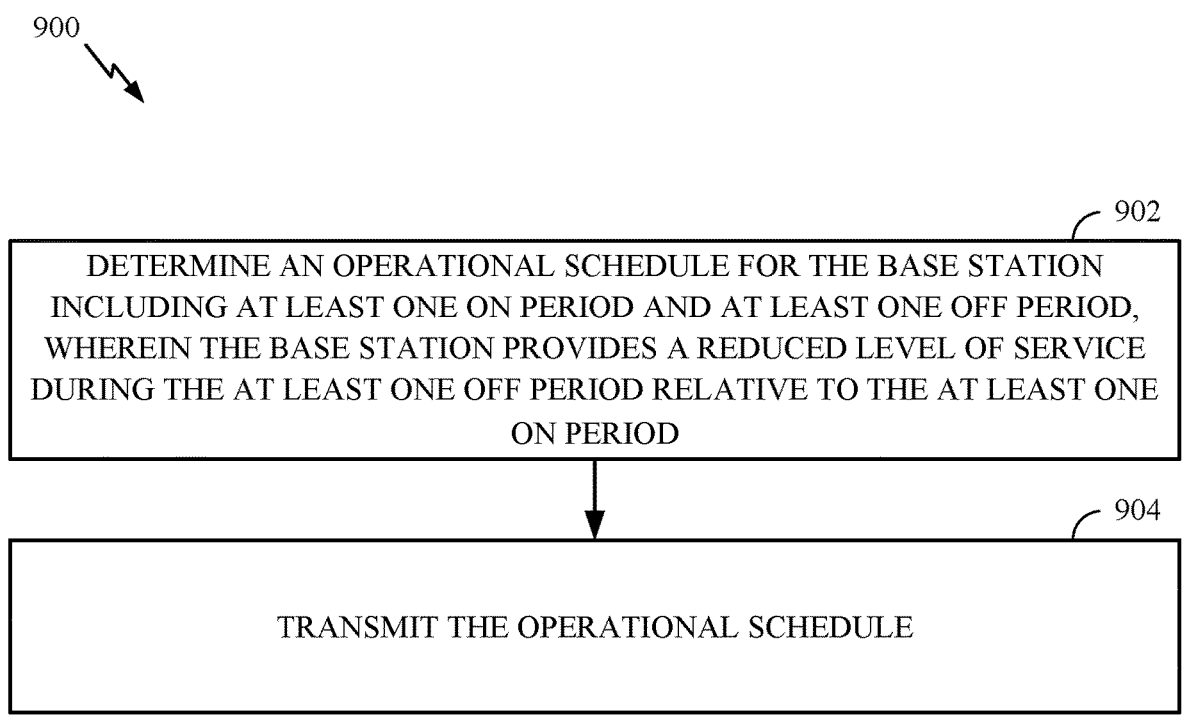
FIG. 9 illustrates example operations for implementing a cell operational schedule (e.g., cell DTX schedule), that may be performed by a network node (e.g., base station, NR, eNB etc.), in accordance with certain aspects of the present disclosure.

FIG. 9 illustrates example operations 900 for implementing a cell operational schedule (e.g., cell DTX schedule), that may be performed by a base station (e.g., distributed unit, TRP, Node B etc.), in accordance with certain aspects of the present disclosure.

Operations 900 begin, at 902 by determining an operational schedule (e.g., DTX schedule) for the base station including at least one ON period (e.g., DTX ON/active period) and at least one OFF period (e.g., DTX OFF/inactive period), wherein the base station provides a reduced level of service during the at least one OFF period relative to the at least one ON period. At 904, the base station transmits the operational schedule.

Figure 10:
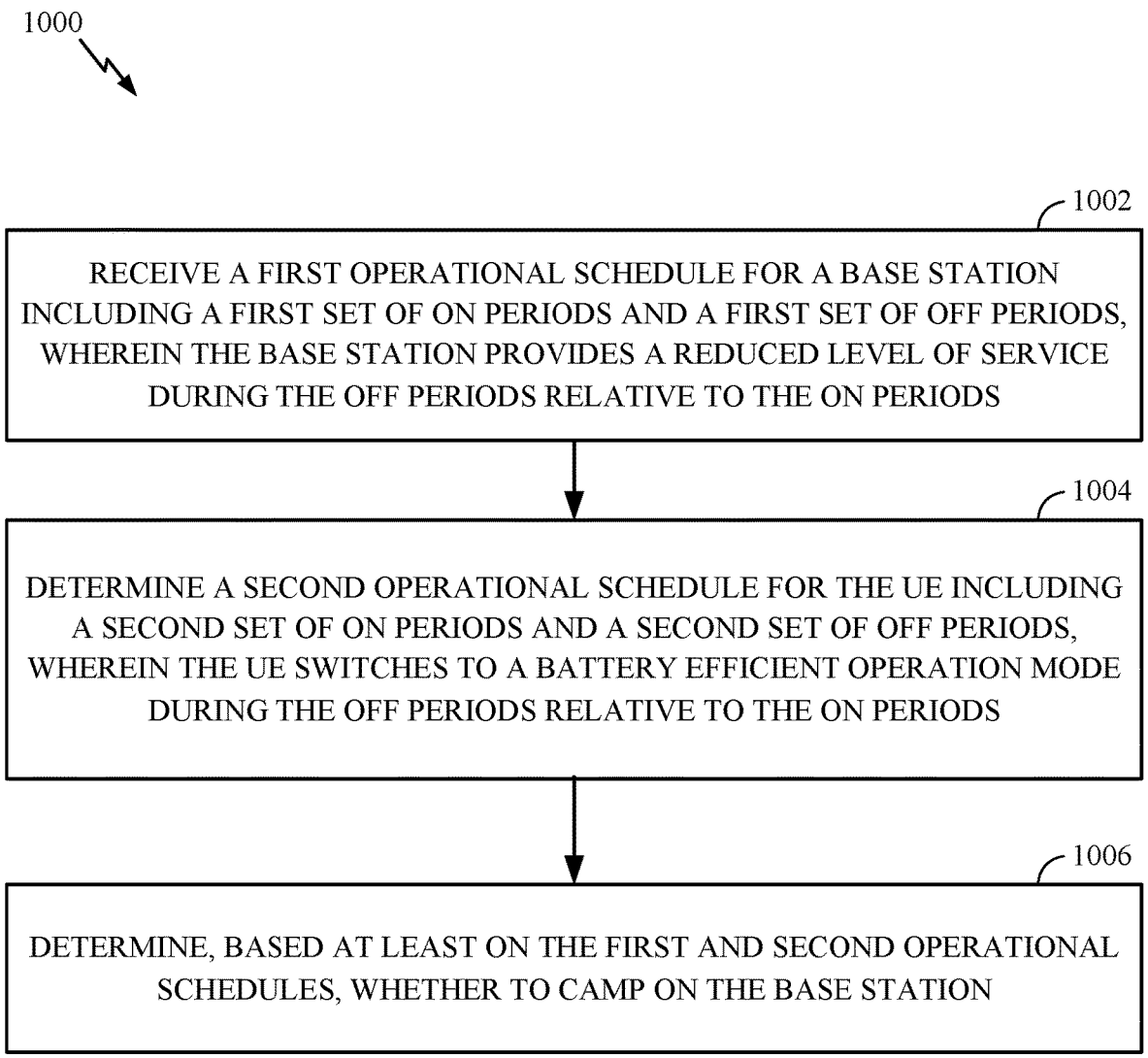
FIG. 10 illustrates example operations for implementing a cell operational schedule (e.g., cell DTX schedule), that may be performed by a user equipment (UE, mobile terminal, etc.), in accordance with certain aspects of the present disclosure.

FIG. 10 illustrates example operations 1000 for implementing a cell operational schedule (e.g., cell DTX schedule), that may be performed by a user equipment (UE, mobile terminal, etc.), in accordance with certain aspects of the present disclosure.

Operations 1000 being, at 1002, by receiving a first operational schedule for a base station (e.g. TRP, distributed unit, Node B, gNB etc.) including a first set of ON periods (e.g., DTX ON/active periods) and a first set of OFF periods (e.g., DTX OFF/inactive periods), wherein the base station provides a reduced level of service during the OFF periods relative to the ON periods. At 1004, the UE determines a second operational schedule for the UE including a second set of ON periods (e.g., DRX ON/active periods) and a second set of OFF periods (e.g., DRX OFF/inactive periods), wherein the UE switches to a battery efficient operation mode during the OFF periods relative to the ON periods. At 1006, the UE determines, based at least on the first and second operational schedules, whether to perform a service associated with the base station. In an aspect, the service may include camping on the base station, paging to the UE and/or establishing a connection with the base station. In an aspect, the UE determines the second operational schedule based on signaling from the base station, the signaling including information regarding the second operational schedule to be used by the UE.

In certain aspects, a cell may advertise a cell ON/OFF schedule (e.g., DTX schedule) either per UE (e.g., via unicast message) or by broadcasting a signal (e.g., system information (SI)) including information regarding the schedule. Information regarding cell operational schedule may include information regarding at least one "ON period" and at least one "OFF period". In an aspect, the cell is turned ON during an "ON period" and remains ON during the entire ON period. In an aspect, the cell transmits a set of discovery signals during the ON periods. The cell may allow one or more devices (e.g., UEs) to camp on to the cell during the cell's ON periods. In an aspect, the cell may be turned OFF or may remain ON during an "OFF period". For example, the cell may be OFF for a portion of the OFF period and may turn ON and remain ON for the remaining portion. In another alternative, the cell may remain OFF or ON for the entire duration of the OFF period. Since the UE may not know whether the cell will remain ON or turned OFF, or what portion of the OFF period the cell may be turned ON, the cell may not allow UEs to camp on the cell during the OFF periods. For example, the cell may terminate all existing connections and may bar one or more devices to camp on the cell during one or more OFF periods.

In an aspect the cell may determine whether or not to allow one or more devices to camp on the base station during an OFF period. For example, the cell may decide to maintain an existing connection during the OFF period, the connection established during an ON period. In an aspect, such decision may be based on one or more messages received from a neighboring device(s), for example indicating traffic congestion in the network. In an aspect, the decision to allow a device to remain camped on to the cell in the OFF period is based on the cell unable to handover the device to a different cell.

In certain aspects, the information regarding the cell operational schedule may include information regarding at least one "ON period" when the cell is turned on for the duration of the period, at least one "OFF period" when the cell is turned off for the duration of the period, and an additional "pseudo OFF period" when the cell may be turned ON. In an aspect, the decision regarding what portion of the "pseudo OFF period" the cell may remain ON is left to node implementation. In an aspect, the cell does not allow a device (e.g., UE) to camp during the "OFF period" and the "pseudo OFF period". In an aspect, the cell may provide the UE with information regarding what portion of the "pseudo OFF period" the cell is scheduled to remain ON, and may allow the UE to camp during this period.

In certain aspects, a device (e.g., UE) reads the information regarding the operational schedule of the cell and determines whether to camp on the cell based on the cell's schedule and an operational schedule (e.g., DRX schedule) of the UE, and/or access type. For example, the UE decides to camp on the cell if at least one UE DRX ON period overlaps at least one cell DTX ON period. In an aspect, the UE decides to camp on the cell if at least a given (e.g., predetermined) number of UE ON periods overlap one or more cell ON periods. Additionally, the UE may camp on the cell if an overlapped portion (e.g., at least one overlapped portion) of UE and cell ON periods is longer than a given threshold overlap period, so that the UE has enough time to turn on and listen to pages. In an aspect, the UE decides not to camp on the cell if at least one UE ON period or a predetermined portion thereof overlaps one or more cell OFF periods. For example, the UE decides not to camp on the cell if an overlapped portion of a UE's ON period (e.g., next ON period) and the cell's OFF period(s) is longer than a given (e.g., predetermined) threshold overlap period. In an aspect, the UE decides not to camp on the cell if at least one cell OFF period is longer than a threshold period, not satisfying minimum required connectivity or reachability requirements.

In an aspect, the UEs operational schedule (e.g., DRX schedule) is a function of one or more services currently active on the UE. For example, service requirements of applications currently active on the UE determine how often the UE needs to wake up and receive pages or how often the UE needs to initiate a connection setup, and additionally a connection and the type of connection required, e.g., small data transfer or a longer lived connection.

Figure 11:
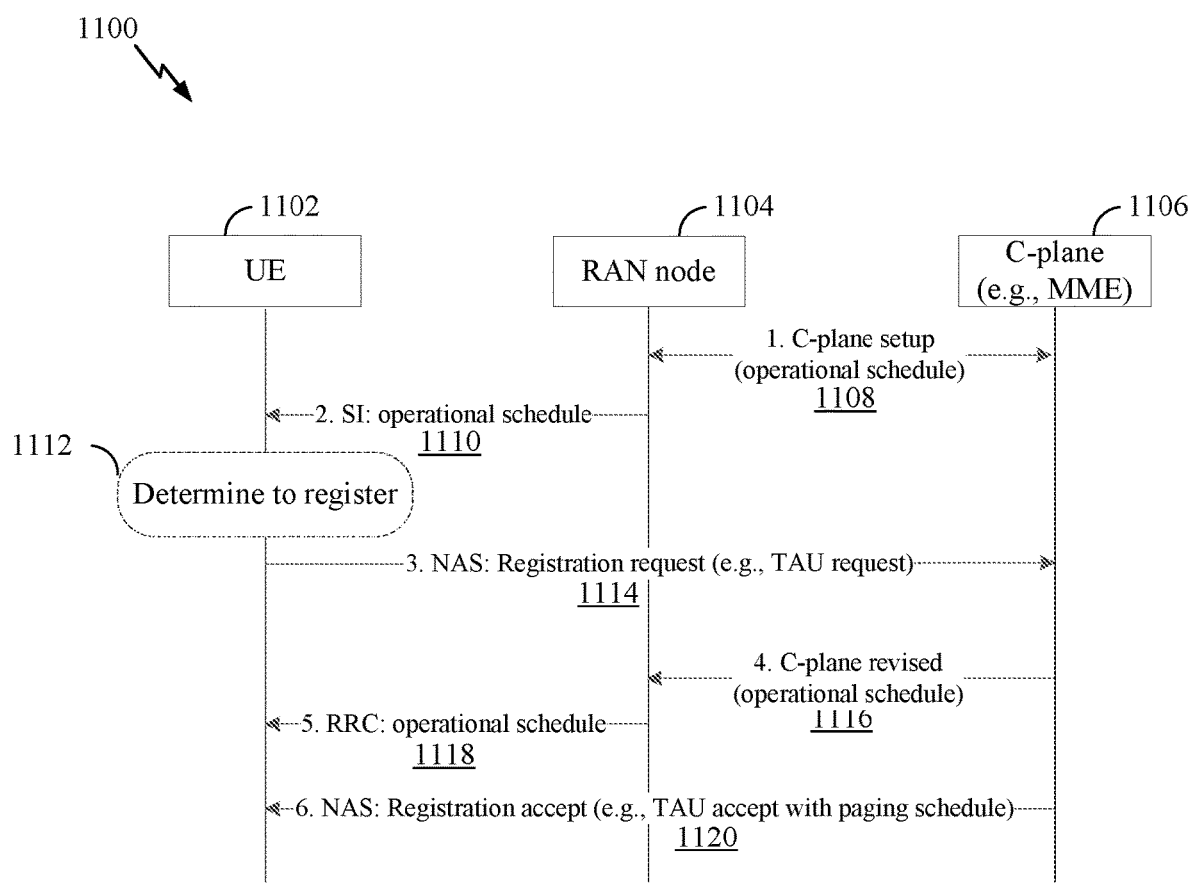
FIG. 11 illustrates an example call flow for implementing a cell operational schedule (e.g., cell DTX schedule), in accordance with certain aspects of the present disclosure.

FIG. 11 illustrates an example call flow 1100 for implementing a cell operational schedule (e.g., cell DTX schedule), in accordance with certain aspects of the present disclosure.

As shown in FIG. 11, the call flow 1100 includes signals exchanged between a UE 1102, a RAN (Radio Access node) 1104 (e.g., base station, TRP, eNB etc.) and a Control-plane (C-plane) network node 1106 (e.g., MME). As shown, at 1108 the RAN node 1104 and the C-plane network node 1106 exchange messages to set up a C-plane interface to service devices (e.g., UEs or other nodes). In an aspect, the RAN node 1104 may determine the cell operational schedule (e.g., cell DTX schedule) or may obtain the schedule from the network node 1106. For example, as part of the C-plane interface setup at 1108, the RAN node 1104 may transmit a setup request to the network node 1106 including a request to configure the cell operational schedule. The RAN node 1104 may receive the cell operational schedule in response to the setup request. In an aspect, the cell operational schedule is determined by OAM (Operations and Management) and configured by the network node 1106 and then provided to the RAN node 1104, e.g., as part of the C-plane setup procedure. In an aspect, the RAN node 1104 determines the cell operational schedule, and transmits the determined schedule to the network node 1106.

As shown at 1110, the RAN node 1104 transmits information regarding the cell operational procedure to the UE 1102, for example as part of the SI or unicast RRC message. At 1112, the UE, based on the received cell operational schedule and the UE's own operational schedule (e.g., DRX schedule), determines whether to camp on the cell.

At 1114, the UE 1102 initiates registration at the network node 1106 by sending a registration request (e.g., TAU request) to the network node 1106 (e.g., via RAN node 1104). In an aspect, the UE may provide an indication of its service requirements in the registration request, for example a DCN ID (Dedicated Core Network ID). In an aspect, the UE indicates its preferred paging interval to the network node 1106. In an aspect, the UE preferred interval is determined by the network node 1106 based on subscription information of the UE.

At 1116, the network node 1106 provides a revised cell operational schedule to the RAN node 1104, the revised schedule, for example, configured to allow more and or longer overlaps of UE and cell ON periods. For example, the network node 1106 may determine that the cell operational schedule may not allow the UE to be camped on the cell and still meet its paging requirements. For example, the cell may be OFF for too long between ON periods for the UE to meet some minimum reachability requirements. In an aspect, the revised cell operational schedule may be based on the preferred paging interval received from the UE 1102. At 1118 the RAN node 1104 forwards the revised cell operational schedule to the UE 1102 for use in future decisions regarding camping on to the cell. For example, the RAN node configures the UE 1102 using a unicast RRC message with the revised operational schedule. In certain aspects, the steps at 1116 and 1118 are optional steps.

At 1120, the network node 1106 provides a registration accept message to the UE 1102. In an aspect, the registration accept message may include a paging schedule for the UE (e.g., DRX schedule) that is compatible with the RAN node/cell operational schedule. For example, the RAN node 1104 signals the cell operational schedule (e.g., of the current service cell/current serving area, e.g., tracking area) to the network node 1106 and the network node 1106 determines the UE DRX schedule based on the cell operational schedule and configures the UE with the determined DRX schedule, e.g., via the registration accept message. Additionally or alternatively, the registration accept message indicates to the UE to camp on another node for paging in order to meet the UE's service requirements.

In certain aspects, the paging schedule (e.g., DRX schedule) may be provided to the UE 1102 by the RAN node 1104. For example, the RAN node 1104 may determine the UE DRX schedule based on the cell operational schedule (e.g., of the current service cell/current serving area, e.g., tracking area), and may configure the UE with the determined DRX schedule.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
   transmitting a preferred paging interval of the UE;
   receiving a first operational schedule for a base station including a first set of ON periods and a first set of OFF periods, wherein the base station is configured to provide a reduced level of service during the first set of OFF periods relative to the first set of ON periods, and wherein the received first operational schedule comprises a schedule adjusted based on the transmitted preferred paging interval;
   determining a second operational schedule for the UE including a second set of ON periods and a second set of OFF periods, wherein the UE is configured to switch to a battery efficient operation mode during the second set of OFF periods relative to the second set of ON periods; and
   camping on the base station based on a length of an overlap between at least one ON period from the second set with at least one ON period from the first set satisfying a minimum reachability requirement of the UE.

2. The method of claim 1, wherein the minimum reachability requirement is satisfied when at least one overlapped portion of the ON periods from the first and second sets is longer than a given threshold overlap period.

3. The method of claim 1, wherein determining the second operational schedule for the UE comprises receiving the second operational schedule, wherein the received second operational schedule is configured based on the first operational schedule.

4. The method of claim 1, wherein the first operational schedule includes a discontinuous transmission (DTX) schedule and the second operational schedule includes a discontinuous reception (DRX) schedule.

5. An apparatus for wireless communication by a user equipment (UE), comprising:
   means for transmitting a preferred paging interval of the UE;
   means for receiving a first operational schedule for a base station including a first set of ON periods and a first set of OFF periods, wherein the base station is configured to provide a reduced level of service during the first set of OFF periods relative to the first set of ON periods, and wherein the received first operational schedule comprises a schedule adjusted based on the transmitted preferred paging interval;
   means for determining a second operational schedule for the UE including a second set of ON periods and a second set of OFF periods, wherein the UE is configured to switch to a battery efficient operation mode during the second set of OFF periods relative to the second set of ON periods; and means for camping on the base station based on a length of an overlap between at least one ON period from the second set with at least one ON period from the first set satisfying a minimum reachability requirement of the UE.

6. The apparatus of claim 5, wherein the minimum reachability requirement is satisfied when at least one overlapped portion of the ON periods from the first and second sets is longer than a given threshold overlap period.

7. The apparatus of claim 5, further comprising means for transmitting a preferred paging interval of the UE, wherein the first operational schedule comprises a schedule adjusted based on the transmitted preferred paging interval.

8. The apparatus of claim 5, wherein the means for determining the second operational schedule for the UE comprises means for receiving the second operational schedule, wherein the received second operational schedule is configured based on the first operational schedule.

9. The apparatus of claim 5, wherein the first operational schedule includes a discontinuous transmission (DTX) schedule and the second operational schedule includes a discontinuous reception (DRX) schedule.

10. A method of wireless communication by a user equipment (UE), comprising:

receiving a first operational schedule for a base station including a first set of ON periods and a first set of OFF periods, wherein the base station is configured to provide a reduced level of service during the first set of OFF periods relative to the first set of ON periods;

determining a second operational schedule for the UE including a second set of ON periods and a second set of OFF periods, wherein the UE is configured to switch to a battery efficient operation mode during the second set of OFF periods relative to the second set of ON periods;

refraining from camping on the base station based on a length of an overlap between at least one ON period from the second set with at least one ON period from the first set failing to satisfy a minimum reachability requirement of the UE;

transmitting a preferred paging interval of the UE, based on the length of the overlap failing to satisfy the minimum reachability requirement of the UE, to request an adjusted first operational schedule for the base station; and receiving, from the base station, the adjusted first operational schedule of the base station such that a length of an overlap between at least one ON period from the second set with at least one ON period from the first set satisfies the minimum reachability requirement of the UE.

11. The method of claim 10, further comprising refraining from camping on the base station based on at least one ON period from the second set overlapping at least one OFF period from the first set.

12. The method of claim 10, further comprising refraining from camping on the base station based on at least one OFF period from the first set being longer than a given threshold period.

13. The method of claim 10, wherein determining the second operational schedule for the UE comprises receiving the second operational schedule, wherein the received second operational schedule is configured based on the first operational schedule.

14. The method of claim 10, wherein the first operational schedule includes a discontinuous transmission (DTX) schedule and the second operational schedule includes a discontinuous reception (DRX) schedule.

15. An apparatus for wireless communication by a user equipment (UE), comprising:

means for receiving a first operational schedule for a base station including a first set of ON periods and a first set of OFF periods, wherein the base station is configured to provide a reduced level of service during the first set of OFF periods relative to the first set of ON periods;

means for determining a second operational schedule for the UE including a second set of ON periods and a second set of OFF periods, wherein the UE is configured to switch to a battery efficient operation mode during the second set of OFF periods relative to the second set of ON periods;

means for refraining from camping on the base station based on a length of an overlap between at least one ON period from the second set with at least one ON period from the first set failing to satisfy a minimum reachability requirement of the UE;

means for transmitting a preferred paging interval of the UE, based on the length of the overlap failing to satisfy the minimum reachability requirement of the UE, to request an adjusted first operational schedule; and means for receiving, from the base station, the adjusted first operational schedule of the base station such that a length of an overlap between at least one ON period from the second set with at least one ON period from the first set satisfies the minimum reachability requirement of the UE.

16. The apparatus of claim 15, further comprising means for refraining from camping on the base station based on at least one ON period from the second set overlapping at least one OFF period from the first set.

17. The apparatus of claim 15, further comprising means for refraining from camping on the base station based on at least one OFF period from the first set being longer than a given threshold period.

18. The apparatus of claim 15, wherein determining the second operational schedule for the UE comprises receiving the second operational schedule, wherein the received second operational schedule is configured based on the first operational schedule.

19. The apparatus of claim 15, wherein the first operational schedule includes a discontinuous transmission (DTX) schedule and the second operational schedule includes a discontinuous reception (DRX) schedule.

20. An apparatus for wireless communications by a user equipment (UE), comprising:

a memory; and a processor coupled to the memory, the memory and the processor configured to:

receive a first operational schedule for a base station including a first set of ON periods and a first set of OFF periods, wherein the base station is configured to provide a reduced level of service during the first set of OFF periods relative to the first set of ON periods;

determine a second operational schedule for the UE including a second set of ON periods and a second set of OFF periods, wherein the UE is configured to switch to a battery efficient operation mode during the second set of OFF periods relative to the second set of ON periods; and refrain from camping on the base station based on a length of an overlap between at least one ON period from the second set with at least one ON period from the first set failing to satisfy a minimum reachability requirement of the UE;

transmit a preferred paging interval of the UE, based on the length of the overlap failing to satisfy the minimum reachability requirement of the UE, to request an adjusted first operational schedule; and receive, from the base station, the adjusted first operational schedule of the base station such that a length of an overlap between at least one ON period from the second set with at least one ON period from the first set satisfies the minimum reachability requirement of the UE.

21. The apparatus of claim 20, wherein the memory and the processor are further configured to refrain from camping on the base station based on at least one ON period from the second set overlapping at least one OFF period from the first set.

22. The apparatus of claim 20, wherein the memory and the processor are further configured to refrain from camping on the base station based on at least one OFF period from the first set being longer than a given threshold period.

23. The apparatus of claim 20, wherein determining the second operational schedule for the UE comprises receiving the second operational schedule, wherein the received second operational schedule is configured based on the first operational schedule.

24. The apparatus of claim 20, wherein the first operational schedule includes a discontinuous transmission (DTX) schedule and the second operational schedule includes a discontinuous reception (DRX) schedule.

25. A non-transitory computer-readable medium including instructions that, when executed by a processing system, cause the processing system to:

receive a first operational schedule for a base station including a first set of ON periods and a first set of OFF periods, wherein the base station is configured to provide a reduced level of service during the first set of OFF periods relative to the first set of ON periods;

determine a second operational schedule for the UE including a second set of ON periods and a second set of OFF periods, wherein the UE is configured to switch to a battery efficient operation mode during the second set of OFF periods relative to the second set of ON periods; and refrain from camping on the base station based on a length of an overlap between at least one ON period from the second set with at least one ON period from the first set failing to satisfy a minimum reachability requirement of the UE;

transmit a preferred paging interval of the UE, based on the length of the overlap failing to satisfy the minimum reachability requirement of the UE, to request an adjusted first operational schedule; and receive, from the base station, the adjusted first operational schedule of the base station such that a length of an overlap between at least one ON period from the second set with at least one ON period from the first set satisfies the minimum reachability requirement of the UE.

26. An apparatus for wireless communications by a user equipment (UE), comprising:

a memory; and a processor coupled to the memory, the memory and the processor configured to:

transmit a preferred paging interval of the UE;

receive a first operational schedule for a base station including a first set of ON periods and a first set of OFF periods, wherein the base station is configured to provide a reduced level of service during the first set of OFF periods relative to the first set of ON periods, and wherein the received first operational schedule comprises a schedule adjusted based on the transmitted preferred paging interval;

determine a second operational schedule for the UE including a second set of ON periods and a second set of OFF periods, wherein the UE is configured to switch to a battery efficient operation mode during the second set of OFF periods relative to the second set of ON periods; and camp on the base station based on a length of an overlap between at least one ON period from the second set with at least one ON period from the first set satisfying a minimum reachability requirement of the UE.

27. The apparatus of claim 26, wherein the minimum reachability requirement is satisfied when at least one overlapped portion of the ON periods from the first and second sets is longer than a given threshold overlap period.

28. The apparatus of claim 26, wherein the memory and the processor are further configured to transmit a preferred paging interval of the UE, wherein the first operational schedule comprises a schedule adjusted based on the transmitted preferred paging interval.

29. The apparatus of claim 26, wherein determining the second operational schedule for the UE comprises receiving the second operational schedule, wherein the received second operational schedule is configured based on the first operational schedule.

30. The apparatus of claim 26, wherein the first operational schedule includes a discontinuous transmission (DTX) schedule and the second operational schedule includes a discontinuous reception (DRX) schedule.

31. A non-transitory computer-readable medium including instructions that, when executed by a processing system, cause the processing system to:

transmit a preferred paging interval of the UE;

receive a first operational schedule for a base station including a first set of ON periods and a first set of OFF periods, wherein the base station is configured to provide a reduced level of service during the first set of OFF periods relative to the first set of ON periods, and wherein the received first operational schedule comprises a schedule adjusted based on the transmitted preferred paging interval;

determine a second operational schedule for the UE including a second set of ON periods and a second set of OFF periods, wherein the UE is configured to switch to a battery efficient operation mode during the second set of OFF periods relative to the second set of ON periods; and camp on the base station based on a length of an overlap between at least one ON period from the second set with at least one ON period from the first set satisfying a minimum reachability requirement of the UE.

* * * * *